(12) United States Patent
Lin et al.

(10) Patent No.: US 12,082,157 B2
(45) Date of Patent: Sep. 3, 2024

(54) USER EQUIPMENT AND METHOD FOR RESOURCE EXCLUSION AND SELECTION IN NEW RADIO SIDELINK COMMUNICATION OF SAME

(71) Applicant: GUANGDONG OPPO MOBILE TELECOMMUNICATIONS CORP., LTD., Dongguan (CN)

(72) Inventors: Huei-Ming Lin, South Yarra (AU); Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 356 days.

(21) Appl. No.: 17/554,152

(22) Filed: Dec. 17, 2021

(65) Prior Publication Data

US 2022/0110096 A1 Apr. 7, 2022

Related U.S. Application Data

(63) Continuation of application No. PCT/CN2019/095693, filed on Jul. 12, 2019.

(51) Int. Cl.
*H04W 72/02* (2009.01)
*H04B 17/318* (2015.01)
*H04W 24/08* (2009.01)

(52) U.S. Cl.
CPC .......... *H04W 72/02* (2013.01); *H04B 17/318* (2015.01); *H04W 24/08* (2013.01)

(58) Field of Classification Search
CPC .... H04W 72/02; H04W 24/08; H04B 17/318; H04B 17/382
See application file for complete search history.

(56) References Cited

U.S. PATENT DOCUMENTS

2021/0219269 A1* 7/2021 Lee ................. H04W 24/10
2021/0400639 A1* 12/2021 Lee ................. H04W 72/02
(Continued)

FOREIGN PATENT DOCUMENTS

CN 108810906 A 11/2018
CN 109983712 A 7/2019
(Continued)

OTHER PUBLICATIONS

Supplementary Search Report Dated Jun. 8, 2022 From the Extended European search report(EESR) of the Application No. 19937896.9, 9 pages.
(Continued)

*Primary Examiner* — Jamal Javaid
*Assistant Examiner* — Ryan C Kavleski
(74) *Attorney, Agent, or Firm* — BAYES PLLC (57) ABSTRACT

A user equipment and a method for resource exclusion and selection in new radio sidelink communication of the same are provided. The method includes performing within a sidelink sensing period a resource sensing procedure, determining an initial candidate resource set within a resource selection window based on a sensing result from performing the resource sensing procedure, excluding a sidelink resource from the initial candidate resource set to form an updated candidate resource set, and performing selection of a sidelink resource from the updated candidate resource set.

18 Claims, 6 Drawing Sheets

(56) References Cited

U.S. PATENT DOCUMENTS

2022/0095281 A1* 3/2022 Zhao .................. H04W 72/542
2022/0150937 A1* 5/2022 Kim ..................... H04B 7/0426

FOREIGN PATENT DOCUMENTS

| EP | 3282767 A1 | 2/2018 |
| EP | 3352402 A1 | 7/2018 |
| EP | 3468272 A1 | 4/2019 |
| EP | 3497999 A1 | 6/2019 |
| WO | 2019031926 A1 | 2/2019 |

OTHER PUBLICATIONS

International Search Report and the Written Opinion Dated Apr. 13, 2020 From the International Searching Authority Re. Application No. PCTCN2019095693, 9 pages.

* cited by examiner

USER EQUIPMENT AND METHOD FOR RESOURCE EXCLUSION AND SELECTION IN NEW RADIO SIDELINK COMMUNICATION OF SAME

CROSS REFERENCE TO RELATED APPLICATIONS

The disclosure is a continuation of an International Application No. PCT/CN2019/095693, filed on Jul. 12, 2019, titled "USER EQUIPMENT AND METHOD FOR RESOURCE EXCLUSION AND SELECTION IN NEW RADIO SIDELINK COMMUNICATION OF SAME", which is incorporated by reference in the present application in its entirety.

BACKGROUND OF DISCLOSURE

1. Field of Disclosure

The present disclosure relates to the field of communication systems, and more particularly, to a user equipment and a method for resource exclusion and selection in new radio (NR) sidelink (SL) communication of the same.

2. Description of Related Art

In an early development phase of sidelink (SL) communication technology for 4th generation long term evolution (4G-LTE) mobile wireless system, one of the main design objective was to provide a direct and reliable user equipment (UE)-to-UE broadcast link to support mission critical applications (such as public safety, emergency, and disaster deployments) and basic road safety services (such as vehicle-to-vehicle, vehicle-to-infrastructure, and vehicle-to-pedestrian). Since it is often for emergency/disaster areas and the required vehicle-to-everything (V2X) communication range to be quite large in practice, transmission of SL communication messages was designed to use a maximum allowable power (i.e. PCMAX) in order to reach as many UEs as possible. This may, however, cause an in-band emission (IBE) interference problem, which is also commonly known as the near-far effect in wireless communication, where a nearby UE's transmission is overwhelmingly larger than a transmission from a faraway UE in adjacent/neighboring SL resources and causing significant interference to the faraway UE's transmission. As such, a concept of resource pool zoning is introduced in LTE-SL communication, where nearby UEs that are within a same geographical physical zone area share a same set of SL resources for transmission in order to ensure similar SL reception power in adjacent/neighboring SL resources is experienced for receiver UEs (Rx-UEs).

In an evolution of intelligent transportation system (ITS), more advanced V2X use cases and services such as vehicle platooning, advanced/autonomous driving, and extended sensor sharing are to be supported by the next generation of sidelink communication technology. For many of these use cases, the use of groupcast and unicast sidelink communications for local/nearby vehicles becomes necessary. Besides the ITS system, direct SL communication among a group of nearby devices or just between two local UEs are also becoming a trend for commercial applications (e.g. augmented reality (AR)/virtual reality (VR) gaming) and public safety services (e.g. police, fire, and ambulance departments). Since a physical separation distance among local UEs within a same group is expected to be short, the amount of radio transmission power per UE can be reduced to maximize frequency resource reuse and to save battery consumption for portable devices. However, if these groupcast or unicast UEs are collocated in the same geographical area and sharing the same set of adjacent/neighboring SL resources with broadcast UEs transmitting at maximum power (PCMAX), the same IBE interference problem described previously would occur again under resource pool zoning.

In details, due to the mechanism of power control in groupcast and unicast SL communication, it can create transmission (Tx) power imbalance among UEs within same geographical zone utilizing the same SL resource pool, and thus resulting in IBE interference problem for Rx-UE receiving transmissions in adjacent/neighboring physical resource blocks (PRBs). Additionally, due to uneven distribution of V2X UEs on the road in practice, such as vehicles, pedestrians, and road side units (RSUs), vehicle traffic in one direction could be heavily congested but rather empty in the other direction, or pedestrians are crowded on local street level in one geographical zone but empty on freeway/highway in another zone. Therefore, creating uneven usage of total available SL resources where certain SL resource zones are highly congested causing transmission (Tx) collisions and degradation in system and link level performance (i.e. quality of service cannot be guaranteed) while other SL resource zones are underutilized.

Furthermore, it is also uncertain whether UE's physical geographical location information (i.e., global positioning system (GPS) location/coordinates) can be made available and to be known at a physical layer such that the UE will be able to select resources from the correct and intended SL resource zone for transmissions, as UE's physical geolocation information is determined by a non-3GPP technology on a different processing chipset. And usually such GPS coordinates are only made available to the application layer only. Therefore, there is a high degree of uncertainty that SL resource zoning can work in practice.

SUMMARY

An object of the present disclosure is to propose a user equipment and a method for resource exclusion and selection in new radio (NR) sidelink (SL) communication of the same to mitigate an in-band emission (IBE) interference problem from imbalanced reception power in adjacent sidelink resources and/or resolve sidelink resource pool utilization deficiency issue associated with a resource pool partitioning based on geographical zoning.

In a first aspect of the present disclosure, a user equipment for resource exclusion and selection in new radio (NR) sidelink (SL) communication includes a memory, a transceiver, and a processor coupled to the memory and the transceiver. The processor is configured to perform within a sidelink sensing period a resource sensing procedure, determine an initial candidate resource set within a resource selection window based on a sensing result from performing the resource sensing procedure, exclude a sidelink resource from the initial candidate resource set to form an updated candidate resource set, and perform selection of a sidelink resource from the updated candidate resource set.

In a second aspect of the present disclosure, a method for resource exclusion and selection in new radio (NR) sidelink (SL) communication of a user equipment includes performing within a sidelink sensing period a resource sensing procedure, determining an initial candidate resource set within a resource selection window based on a sensing result from performing the resource sensing procedure, excluding a sidelink resource from the initial candidate resource set to form an updated candidate resource set, and performing selection of a sidelink resource from the updated candidate resource set.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
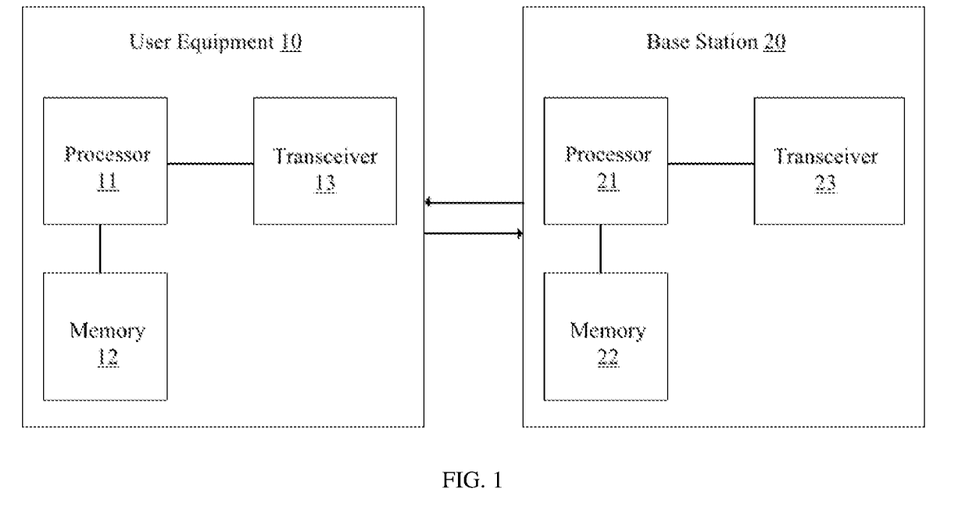
FIG. 1 is a block diagram of a user equipment (UE) and a base station for resource exclusion and selection in new radio (NR) sidelink (SL) communication according to an embodiment of the present disclosure.

FIG. 1 illustrates that, in some embodiments, a user equipment (UE) 10 and a base station (BS) 20 for resource exclusion and selection in new radio (NR) sidelink (SL) communication according to an embodiment of the present disclosure are provided. The UE 10 may include a processor 11, a memory 12, and a transceiver 13. The base station 20 may include a processor 21, a memory 22, and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N), and non-V2X communications including mission critical communication for public safety services and short-range communication for commercial applications such as augmented reality (AR)/virtual reality (VR) gaming and wearable devices according to a sidelink technology developed under 3rd generation partnership project (3GPP) release 14, 15, 16, and beyond. UEs communicate with each other directly via a sidelink interface such as a PC5 interface. In addition, some embodiments of the present disclosure relate sidelink communication technology in 3GPP NR release 16 and beyond.

In some embodiments, the processor 11 is configured to perform within a sidelink sensing period a resource sensing procedure, determine an initial candidate resource set within a resource selection window based on a sensing result from performing the resource sensing procedure, exclude a sidelink resource from the initial candidate resource set to form an updated candidate resource set, and perform selection of a sidelink resource from the updated candidate resource set.

In some embodiments, performing the resource sensing procedure includes decoding one or more physical sidelink control channels (PSCCHs) received within the sidelink sensing period. In some embodiments, performing the resource sensing procedure includes extracting resource allocation and/or reservation information. In some embodiments, performing the resource sensing procedure includes measuring a received signal strength indicator (RSSI) and/or reference signal received power (RSRP) level of a received sidelink transmission from another user equipment. In some embodiments, determining the initial candidate resource set includes excluding an allocated and/or reserved sidelink resource within the resource selection window. In some embodiments, excluding the sidelink resource from the initial candidate resource set to form the updated candidate resource set includes excluding a sidelink resource based on a target transmission power, a measurement of a RSSI and/or RSRP level of the allocated and/or reserved sidelink resource, and a maximum allowable power difference.

In some embodiments, excluding the sidelink resource from the initial candidate resource set includes excluding all sidelink resources that are not adjacent to the allocated and/or reserved sidelink resource having an acceptable RSSI and/or RSRP level to form the updated candidate resource set. In some embodiments, excluding the sidelink resource from the initial candidate resource set to form the updated candidate resource set includes excluding any sidelink resource from the initial candidate resource set that is not feasible for the processor 11 to set or determine transmission output power of the user equipment 10 at a level that is within an allowable maximum power difference to all adjacent sidelink resources. In some embodiments, performing the selection of the sidelink resource from the updated candidate resource set is randomly or based on a prioritization rule for a sidelink transmission. In some embodiments, performing the selection of the sidelink resource from the updated candidate resource set further includes adjusting a transmission output power of the selection of the sidelink resources.

In some embodiments, for the sidelink resource exclusion and selection method, it aims to mitigate the IBE interference problem from imbalanced reception power in adjacent SL resources and resolve sidelink resource pool utilization deficiency issue associated with a resource pool partitioning based on geographical zoning. In order to achieve these, it is proposed for a UE 10, such as a Tx-UE, to monitor SL resource pool usage, measure received signal strength level of reserved resources, and exclude resources with high received power difference from its final SL resource selection, select from SL resources only adjacent to reserved resources with acceptable power difference, or select from any available resources and adjust Tx-UE's SL transmission parameters to adapt to the measured channel condition. Other benefits of adopting the invented SL resource exclusion and selection method in some embodiments are as following. 1. To eliminate the need of partitioning or zoning SL resource pools based on UE geographical location and thus reducing among of necessary configuration signaling. 2. To avoid uncertainty of obtaining or to reduce UE implementation complexity of exchanging UE geographical location information (e.g. GPS coordinates) at UE 5G-NR physical layer.

Figure 2:
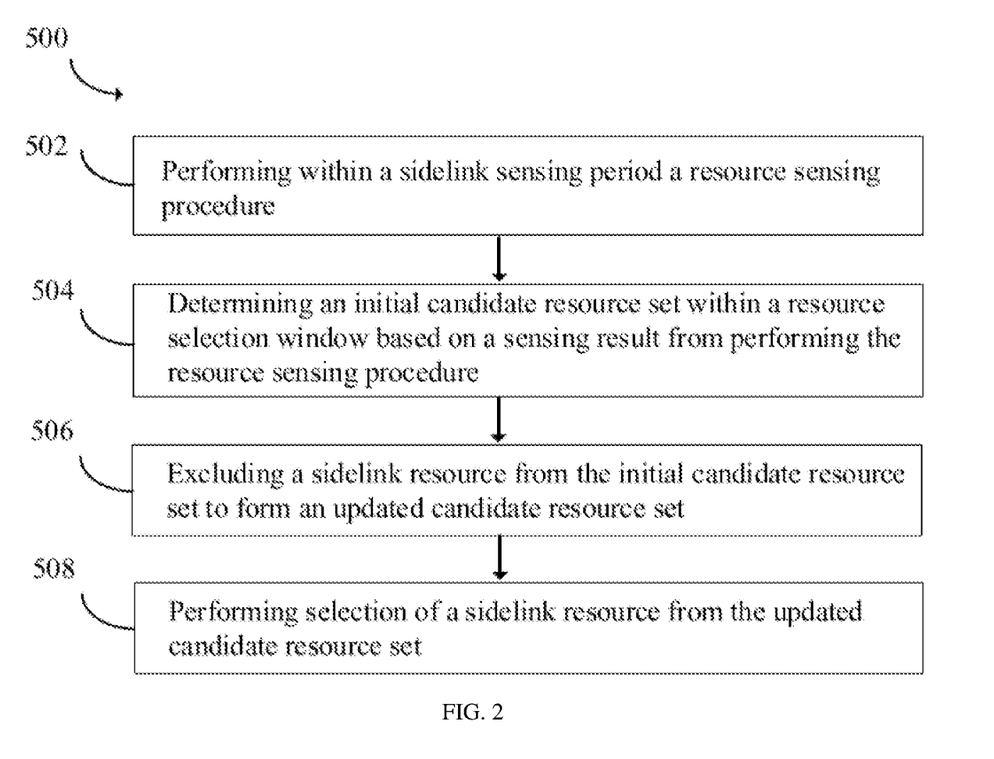
FIG. 2 is a flowchart illustrating a method for resource exclusion and selection in new radio (NR) sidelink (SL) communication of a user equipment according to an embodiment of the present disclosure.

FIG. 2 illustrates a method 500 for resource exclusion and selection in new radio (NR) sidelink (SL) communication of a user equipment according to an embodiment of the present disclosure. In some embodiments, the method 500 includes: a block 502, performing within a sidelink sensing period a resource sensing procedure, a block 504, determining an initial candidate resource set within a resource selection window based on a sensing result from performing the resource sensing procedure, a block 506, excluding a sidelink resource from the initial candidate resource set to form an updated candidate resource set, and a block 508, performing selection of a sidelink resource from the updated candidate resource set.

In some embodiments, excluding the sidelink resource from the initial candidate resource set includes excluding all sidelink resources that are not adjacent to the allocated and/or reserved sidelink resource having an acceptable RSSI and/or RSRP level to form the updated candidate resource set. In some embodiments, excluding the sidelink resource from the initial candidate resource set to form the updated candidate resource set includes excluding any sidelink resource from the initial candidate resource set that is not feasible for the user equipment to set or determine transmission output power of the user equipment at a level that is within an allowable maximum power difference to all adjacent sidelink resources. In some embodiments, performing the selection of the sidelink resource from the updated candidate resource set is randomly or based on a prioritization rule for a sidelink transmission. In some embodiments, performing the selection of the sidelink resource from the updated candidate resource set further includes adjusting a transmission output power of the selection of the sidelink resources.

In some embodiments, for the sidelink resource exclusion and selection method, it aims to mitigate the IBE interference problem from imbalanced reception power in adjacent SL resources and resolve sidelink resource pool utilization deficiency issue associated with a resource pool partitioning based on geographical zoning. In order to achieve these, it is proposed for a UE 10, such as a Tx-UE, to monitor SL resource pool usage, measure received signal strength level of reserved resources, and exclude resources with high received power difference from its final SL resource selection, select from SL resources only adjacent to reserved resources with acceptable power difference, or select from any available resources and adjust Tx-UE's SL transmission parameters to adapt to the measured channel condition. Other benefits of adopting the invented SL resource exclusion and selection method in some embodiments are as following. 1. To eliminate the need of partitioning or zoning SL resource pools based on UE geographical location and thus reducing among of necessary configuration signaling. 2. To avoid uncertainty of obtaining or to reduce UE implementation complexity of exchanging UE geographical location information (e.g. GPS coordinates) at UE 5G-NR physical layer.

In some embodiments, a sidelink (SL) resource exclusion and selection method for a user equipment (UE) to transmit (Tx) packet transport blocks (TBs) over the 5th generation new radio (5G-NR) SL interface intended for reception of other UEs is provided. The Tx-UE is first configured by a network or pre-configured with a resource pool for SL transmission, but the Tx-UE may or may not involve in a SL groupcast or unicast communication session with the intended receiver UEs. In order for the Tx-UE to select appropriate SL resource(s) for its packet TB transmission, it follows the following 3 steps.

First step: The Tx-UE first performs a sensing procedure including monitoring SL resources usage by blind decoding of SL transmissions received over a sensing period on the (pre-)configured Tx resource pool, extracting resource allocation and/or reservation information provided by other UEs, and measuring received signal strength indication (RSSI) and/or reference signal received power (RSRP) on the decoded SL transmissions.

Figure 3:
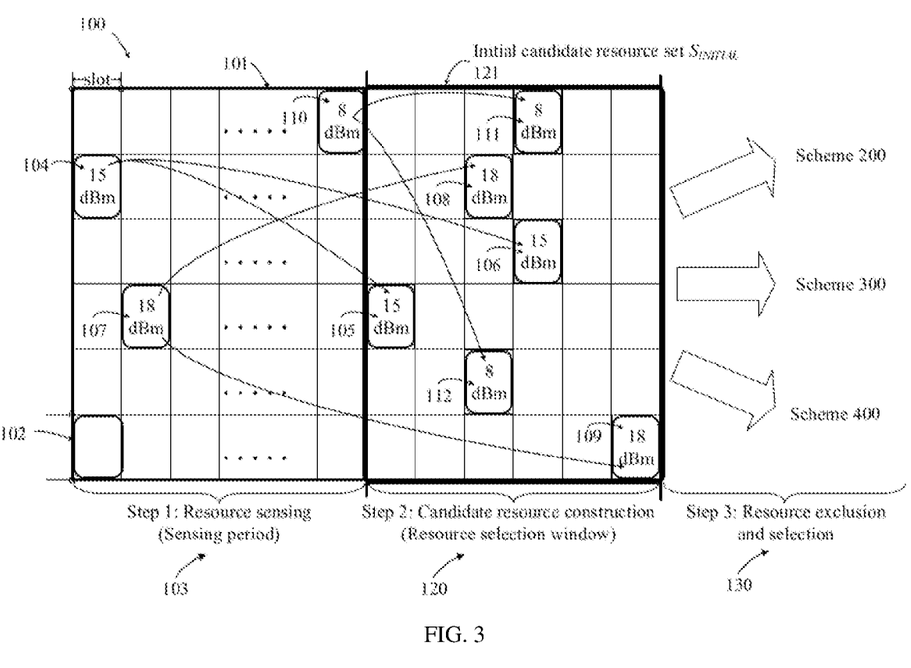
FIG. 3 is a schematic diagram of an exemplary illustration of a proposed overall resource sensing, exclusion, and selection method according to an embodiment of the present disclosure.

FIG. 3 is an exemplary illustration of a proposed overall resource sensing, exclusion, and selection method according to an embodiment of the present disclosure. In reference to the exemplary illustration of an embodiment of the disclosure in FIG. 3, in a proposed overall resource sensing, exclusion, and selection operation 100, in a (pre-)configured SL Tx resource pool 101 includes a basic unit of one SL resource 102, which spans over one slot time length having 14 orthogonal frequency division multiplexing (OFDM) symbols and occupies at least one physical resource block (PRB) or one physical sidelink control channel (PSCCH)/physical sidelink shared channel (PSSCH) sub-channel size in a frequency domain.

In accordance with the first step of an embodiment of the present disclosure, during a sensing period 103 of a time length more than one slot duration, the Tx-UE blindly decodes PSCCH in each SL resource. If PSCCH decoding is successful, the Tx-UE extracts resource allocation information for the current packet TB transmission (including retransmissions), as well as resource reservation information for any future transmissions of different packet TBs from the same UEs. At the same time, the Tx-UE also measures signal strength of the received packet (e.g., based on RSSI or RSRP) to determine received power level of a particular SL transmission. Based on the current received signal strength measurement, the Tx-UE makes a reasonable assumption of likely received signal strength of future transmissions from the same UE.

In reference to the proposed overall resource sensing, exclusion, and selection operation 100, this is illustrated by the Tx-UE successfully decodes PSCCH in SL resource 104 during the sensing period 103, extracts resource allocation and/or reservation information for future SL transmissions in 105 and 106 that falls within a resource selection window 120 for the Tx-UE, and measures the received signal strength (RSSI or RSRP) of the decoded SL transmission in 104 to be 15 dBm. It is also assumed that the measured signal strength in 104 will likely to be the same or very similar for the subsequent SL transmissions in 105 and 106. In the illustrated proposed overall resource sensing, exclusion, and selection operation 100, further examples of SL transmissions received from other UEs using the same resource pool within the sensing period are also shown in 107 and 110 with different measured signal power levels of 18 dBm and 8 dBm, respectively. Similarly, their extracted resource allocation and/or reservation details point to future SL transmissions to occur in 108 and 109 for 107, and 111 and 112 for 110 during the resource selection window 120 for the Tx-UE in interest. And the same received signal power assumption is also made for these future SL transmissions.

Second step: Based on the sensing operation and its output results from the first step, the Tx-UE is able to identify all of available/empty SL resources within the resource selection window that have not been reserved or indicated for use by other UEs for their transmissions and hence determines/constructs an initial candidate resource set (denoted by S_INITIAL) which is a location map within a resource selection window of all available SL resources that can be potentially used for its own SL transmissions. That is, the initial candidate resource set is a set of all SL resources within the resource selection window excluding ones that have been reserved or indicated to be used by other UEs during the sensing procedure in Step 1, where the resource selection window is bounded by latency requirement associated with the packet TB(s) for transmission.

In reference to an exemplary illustration of the proposed overall resource sensing, exclusion, and selection operation 100 in FIG. 1, a determination/construction of the initial candidate resource set 121, S_INITIAL, is a location map of a collection of all SL resources bounded within the resource selection window 120 excluding the ones that have been previously indicated and reserved by other UEs for their future SL transmissions 105, 106, 108, 109, 111, and 112.

Third step: In order to mitigate the previously described in-band emission (IBE) interference problem from large imbalanced power between adjacent SL resources at receiver UE input and to avoid any potential sidelink resource pool utilization deficiency issue associated with resource pool partitioning/zoning, the Tx-UE utilizes one of resource exclusion and selection schemes described below to update its initial candidate resource set and select one or more SL resources for transmitting its SL packet TB(s).

In some embodiments, a scheme is provided. To prevent any potential IBE interference problem within a received OFDM symbol coming from large imbalanced power between neighboring SL resources in a slot is for the Tx-UE to avoid selecting any resources that would cause such issue. To achieve this, the Tx-UE can perform resource exclusion from its initial candidate resource set of any SL resource that will incur a power difference to its adjacent resources of more than X dB from its target SL transmit power level, then carry out the final selection of SL resources from the remaining set of resources for its transmissions.

Figure 4:
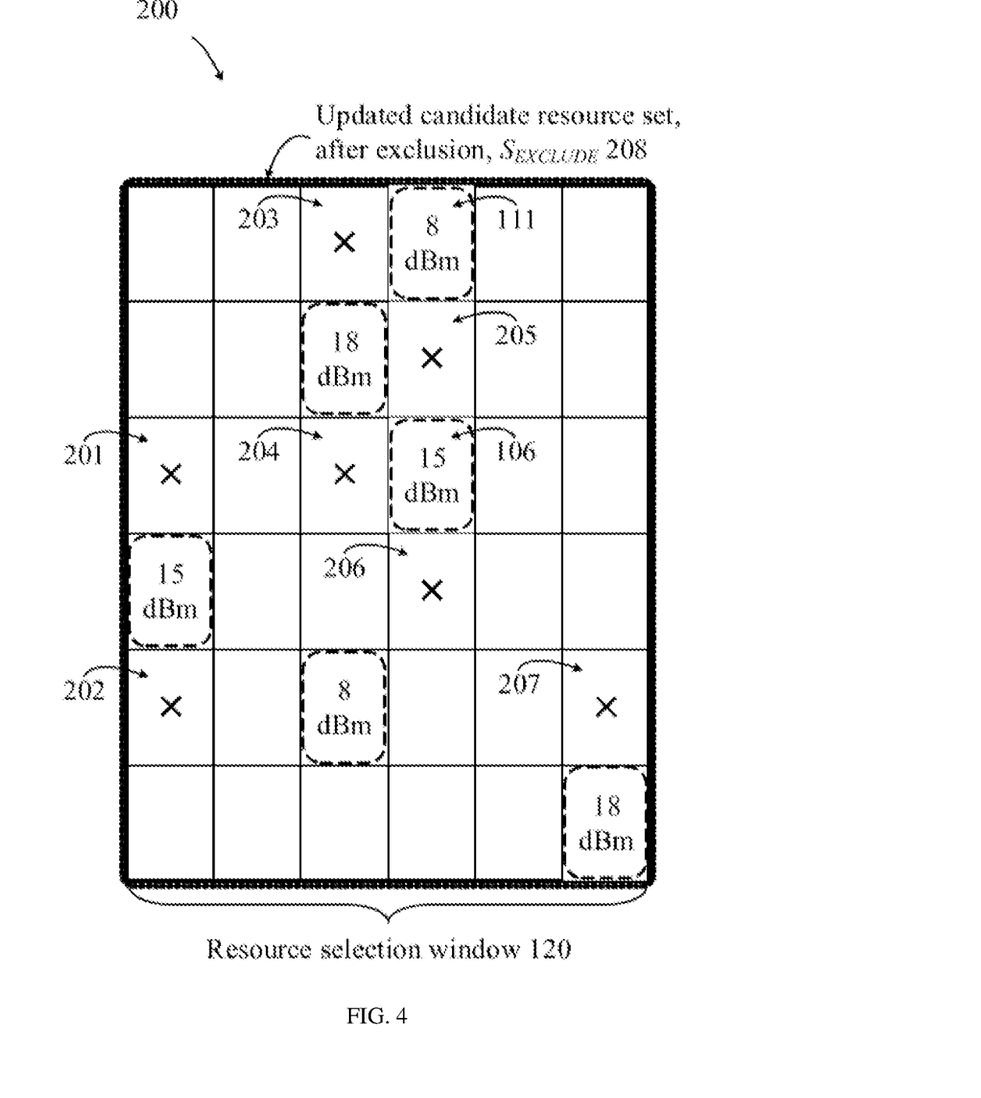
FIG. 4 is a schematic diagram of an exemplary illustration of a SL resource exclusion and selection scheme according to an embodiment of the present disclosure.

The SL resource exclusion and selection scheme 200 in FIG. 4 is an exemplary illustration of one of the proposed SL resource exclusion and selection methods. In reference to the scheme 200 in FIG. 4 and in conjunction with the proposed overall operation 100 in FIG. 3, based on the measured/associated RSSI/RSRP levels for the already allocated/reserved resources from Step 1 and UE's target Tx power, the Tx-UE excludes all SL resources adjacent to resources 105, 106, 108, 109, 111, and 112 from the initial candidate resource set (S_INITIAL) with a power difference larger than X dB. For an excluded SL resource, it has a size of at least one PRB or one PSCCH/PSSCH sub-channel. Assuming the maximum allowable power imbalance difference between adjacent/neighboring SL resources without causing the IBE interference problem is 3 dB (i.e., X=3) and Tx-UE's target transmission power (e.g. after groupcast or unicast power control) is 11 dBm, the said Tx-UE in this example excludes resources 201 to 207 from the initial candidate resource set (S_INITIAL). It should be noted that, although the target Tx power of 11 dBm is not more than 3 dB difference to the reserved SL resource 111 with a measured RSSI/RSRP level of 8 dBm, but the SL resource 205 can still be excluded from the candidate resource set since the power difference to the other adjacent SL resource 106 is 4 dB.

In some embodiments, the remaining SL resources from the initial set 121 after the exclusion is updated to a new candidate resource set, denoted as S_EXCLUDE 208 in FIG. 4. The updated candidate resource set, S_EXCLUDE 208, would then be used by the Tx-UE for the final selection of SL resources for transmission. The final selection could be done by random selection of one or more SL resources for the initial and retransmissions of a packet TB and/or future TBs, or prioritizing SL resources with the least power difference to the adjacent/neighboring ones.

In some embodiments, another scheme is provided. As an alternative SL resource exclusion and selection method to the previous scheme 200 to prevent any potential IBE interference problem due to large imbalanced power difference between adjacent/neighboring SL resources within a slot, the principle mechanism behind another proposed scheme is to select suitable SL resources that are restricted only to the ones that are adjacent/neighboring to already indicated/reserved resources, so as to avoid gaps between resources for SL transmissions and thus to minimize SL resource wastage.

In order to achieve this, the Tx-UE can exclude all SL resources from the initial candidate resource set (S_INITIAL) constructed during Step 2 that are not directly adjacent/neighboring to SL resources with a measured RSSI or RSRP level that is equal to or within the IBE limit of X dB to the target Tx power. Then carry out the final selection of SL resources from the remaining set of resources for its transmissions. The final selection could be done by random selection of one or more SL resources for the initial and retransmissions of a packet TB and/or future TBs, or prioritizing SL resources with the least power difference to the adjacent/neighboring ones.

Figure 5:
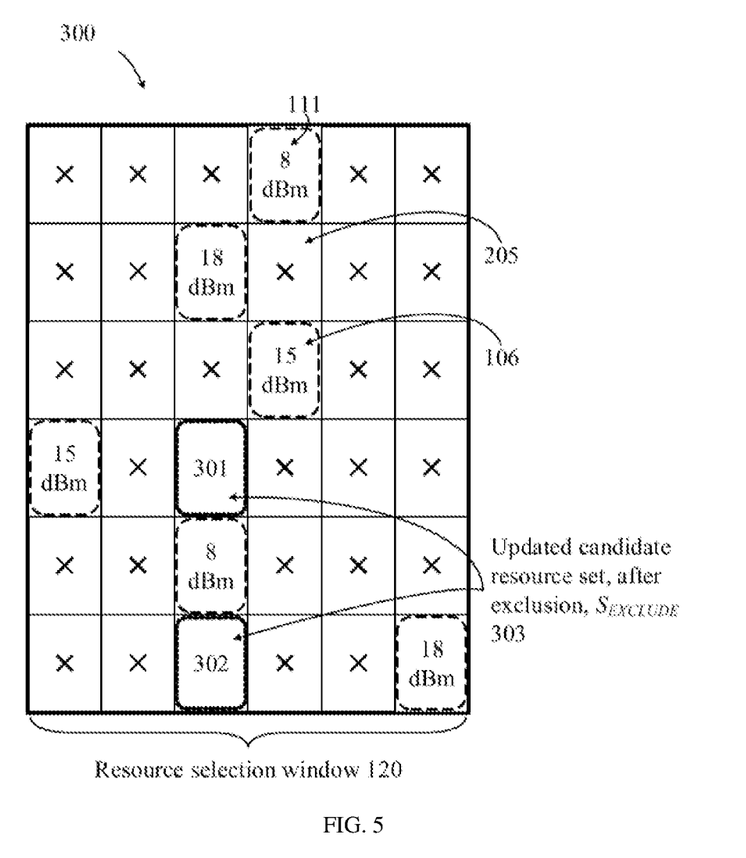
FIG. 5 is a schematic diagram of an exemplary illustration of a SL resource exclusion and selection scheme according to an embodiment of the present disclosure.

FIG. 5 is an exemplary illustration of a SL resource exclusion and selection scheme according to an embodiment of the present disclosure. The SL resource exclusion and selection scheme 300 in FIG. 5 is an exemplary illustration of one of the proposed SL resource exclusion and selection methods. In reference to the scheme 300 in FIG. 5 and in conjunction with the proposed overall operation 100 in FIG. 3, based on the measured/associated RSSI/RSRP levels for the already allocated/reserved resources 105, 106, 108, 109, 111 and 112 from Step 1, the Tx-UE excludes all SL resources from the initial candidate resource set (S_INITIAL) except for SL resources 301 and 302 since their respective power difference to the already allocated/reserved resource 112 is not larger than X dB from UE's target Tx power level. This is again assuming the maximum allowable power imbalance difference between adjacent/neighboring SL resources without causing the IBE interference problem is 3 dB (i.e., X=3) and Tx-UE's target transmission power (e.g. after groupcast or unicast power control) is 11 dBm.

It should be also noted that, although the target Tx power of 11 dBm is not more than 3 dB difference to the reserved SL resource 111 with a measured RSSI/RSRP level of 8 dBm, but the SL resource 205 can still be excluded from the candidate resource set since the power difference to the other adjacent SL resource 106 is 4 dB. The remaining SL resources 301 and 302 in this case from the initial set 121 is then updated to a new candidate resource set after the exclusion, denoted as S_EXCLUDE 303 in FIG. 5, would then be used for the final selection of SL resources for transmission.

In some embodiments, another scheme is provided. As another alternative SL resource exclusion and selection method to the previous scheme 200 and scheme 300 to prevent any potential IBE interference problem due to large imbalanced power difference between adjacent/neighboring SL resources within a slot, the principle mechanism behind another proposed scheme is instead to adapt Tx-UE's transmission power and possibly other transmission parameters (e.g. baseband modulation order and channel coding rate, also commonly known as modulation and coding scheme (MCS) level) as well to the adjacent/neighboring RSSI/RSRP levels with its selected SL resources for transmission, such that their differences in power is controlled within the allowable range of X dB, and at the same time to ensure the transmitted packet TB(s) can still be correctly received and decoded by the target UE(s). For example, for every 2 dB increase or reduction in target transmission power, the Tx-UE may also increase or reduce its MCS by one level, respectively, to compensate for the transmit power change. One main benefit of this scheme is that the Tx-UE may not necessarily need to exclude any SL resources from its initial candidate resource set (S_INITIAL), and hence there is a greater choices of SL resources for transmitting its packet TB(s). As such, minimizing the chance of Tx collision between different transmitting UEs.

In order to achieve this, the first step for the Tx-UE still is to go through the list of initial candidate resource set (S_INITIAL) from Step 2 and exclude any available/empty (unused or unreserved) resources between two indicated/reserved ones within a slot and that the Tx-UE cannot possibly adapt its transmission power to be within the X dB allowable IBE range to both of the two adjacent/neighboring resources. That is, assuming the allowable IBE range is 2 dB and an available/empty resource is between two reserved resources with measured RSSI/RSRP levels of 10 dBm and 15 dBm individually, then this available/empty resource will be excluded from the candidate resource set since the Tx-UE would not be able to adapt its transmit power to be within the 2 dB allowable IBE range to the two adjacent/neighboring resources at the same time.

From the remaining SL resources in the updated candidate resource set (S_EXCLUDE), the Tx-UE then randomly select one or more resources for its transmission of SL packet TB(s). If any of the selected SL resource is adjacent/neighboring to at least one indicated/reserved resource, the Tx-UE adjusts its transmission power, if necessary, to be within the allowable IBE range to the measured RSSI/RSRP level(s) of the adjacent reserved resource(s). Other transmission parameters such as MCS level may be appropriately adjusted as well. Alternatively, the selection of SL resource (s) within the updated candidate resource set (S_EXCLUDE) could be performed based on prioritizing resources that do not require any adjustment to the Tx-UE's target transmission power and MCS level.

Figure 6:
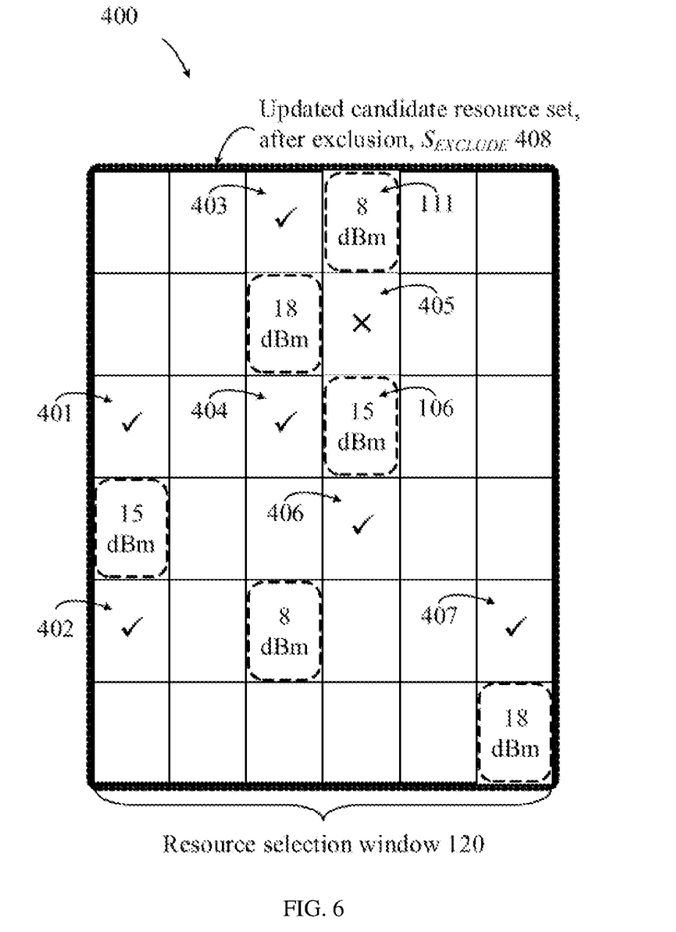
FIG. 6 is a schematic diagram of an exemplary illustration of a SL resource exclusion and selection scheme according to an embodiment of the present disclosure.

FIG. 6 is an exemplary illustration of a SL resource exclusion and selection scheme according to an embodiment of the present disclosure. In reference to a SL resource exclusion and selection scheme 400 in FIG. 6 for exemplary illustration of the scheme 400 of one of the proposed SL resource exclusion and selection methods, and in conjunction with the operation 100 in FIG. 3, the Tx-UE first performs exclusion of SL resources from the initial candidate set of resources, S_INITIAL, 121 from Step 2 that would not be possible for the Tx-UE to adapt its transmission output power and still satisfy the IBE requirement to its adjacent/neighboring resources. For the illustrated case in the scheme 400, assuming the maximum allowable IBE requirement level is again 3 dB, SL resource 405 can be excluded from the resource set S_INITIAL, since the assumed RSSI/RSRP level for resource 106 is 15 dBm and RSSI/RSRP level for resource 111 is 8 dBm, and (15 dBm−8 dBm)/2 is more than the IBE limit of 3 dB. For SL resources 401, 402, 403, 404, 406, and 407 that would normally be excluded under the proposed scheme 200, if the target transmission power for the Tx-UE is 11 dBm, are still part of overall available resources available for selection. Therefore, the updated candidate resource set after the resource exclusion, S_EXCLUDE 408, retained much of the same resources from the initial candidate resource set (S_INITIAL) for the final resource selection by the Tx-UE. Once the final selection is carried out and if one or more of resources from 401, 402, 403, 404, 406, and 407 are selected, the Tx-UE would need to adjust its target transmission output power to be within the IBE requirement limit and the MCS level for the packet TB(s) accordingly.

In some embodiments, the proposed resource exclusion and selection for transmitting sidelink packet TBs in NR sidelink communication includes three main processing stages/steps as the following.

During the first step, the Tx-UE performs within a sidelink sensing period a resource sensing procedure which involves monitoring of SL resource usage, extracting resource allocation and/or reservation information, and measuring RSSI and/or RSRP levels of received SL transmissions from other UEs.

During the second step, the Tx-UE determines/constructs an initial set of candidate resources within a resource selection window based on the sensing results from the first step, at least to avoid Tx collision among different transmitting UEs using the same resource pool.

During the third step, in order to mitigate potential IBE interference problem between adjacent SL resources and uneven utilization of SL resource issue, the Tx-UE excludes SL resources from the initial candidate resource set, performs final selection of SL resources and potentially also adapt its transmit output power and other transmission related parameters based on one of the proposed 3 schemes.

In some embodiments, for the proposed SL resource exclusion and selection scheme 200 as illustrated in FIG. 4, the Tx-UE excludes all SL resources from the initial candidate resource set that will cause IBE interference problem by evaluating its target transmission power, measured RSSI/RSRP level of reserved resources, and a maximum allowable power difference (IBE requirement limit), and selects necessary SL resources from the remaining candidate resource set randomly or based on a prioritization rule for its SL transmission of packet TB(s).

In some embodiments, for the proposed SL resource exclusion and selection scheme 300 as illustrated in FIG. 5, the Tx-UE excludes all SL resources from the initial candidate resource set that are not adjacent/neighboring to an already reserved resource with an acceptable measured RSSI/RSRP level that would not cause any IBE interference problem to its own SL transmission, and randomly selects necessary resources from the remaining candidate resource set for its SL transmission of packet TB(s).

In some embodiments, for the proposed SL resource exclusion and selection Scheme 400 as illustrated in FIG. 6, the Tx-UE excludes only resources from the initial candidate resource set that are not possible for the UE to adapt its transmission output power and still able to satisfies IBE requirement limit to all of its adjacent/neighboring reserved resources, selects necessary SL resources from the remaining candidate resource set randomly or based on a prioritization rule for its SL transmission of packet TB(s), and adjusts its transmission output power and other transmission related parameters, if necessary, so that the IBE requirement limit is not violated and at the same time ensuring packet TB(s) can still be correctly received and decoded by the target UE(s).

In summary, some embodiments of the present disclosure have commercial interest and business importance as the following. 1. Simple and efficient mechanism for mitigating IBE interference problem, instead of using the existing resource pool partitioning technique based on UE's geographical location. 2. Leads to better SL resource overall utilization. Applications of some embodiments of the present disclosure can be used by 5G-NR chipset vendors, V2X communication system development vendors, automakers including cars, trains, trucks, buses, bicycles, moto-bikes, helmets, drones (unmanned aerial vehicles), smartphone makers, communication devices for public safety use, AR/VR device maker for example gaming, conference/seminar, education purposes, and etc. The embodiment of the present disclosure is a combination of techniques/processes that can be adopted in 3GPP specification to create an end product.

Figure 7:
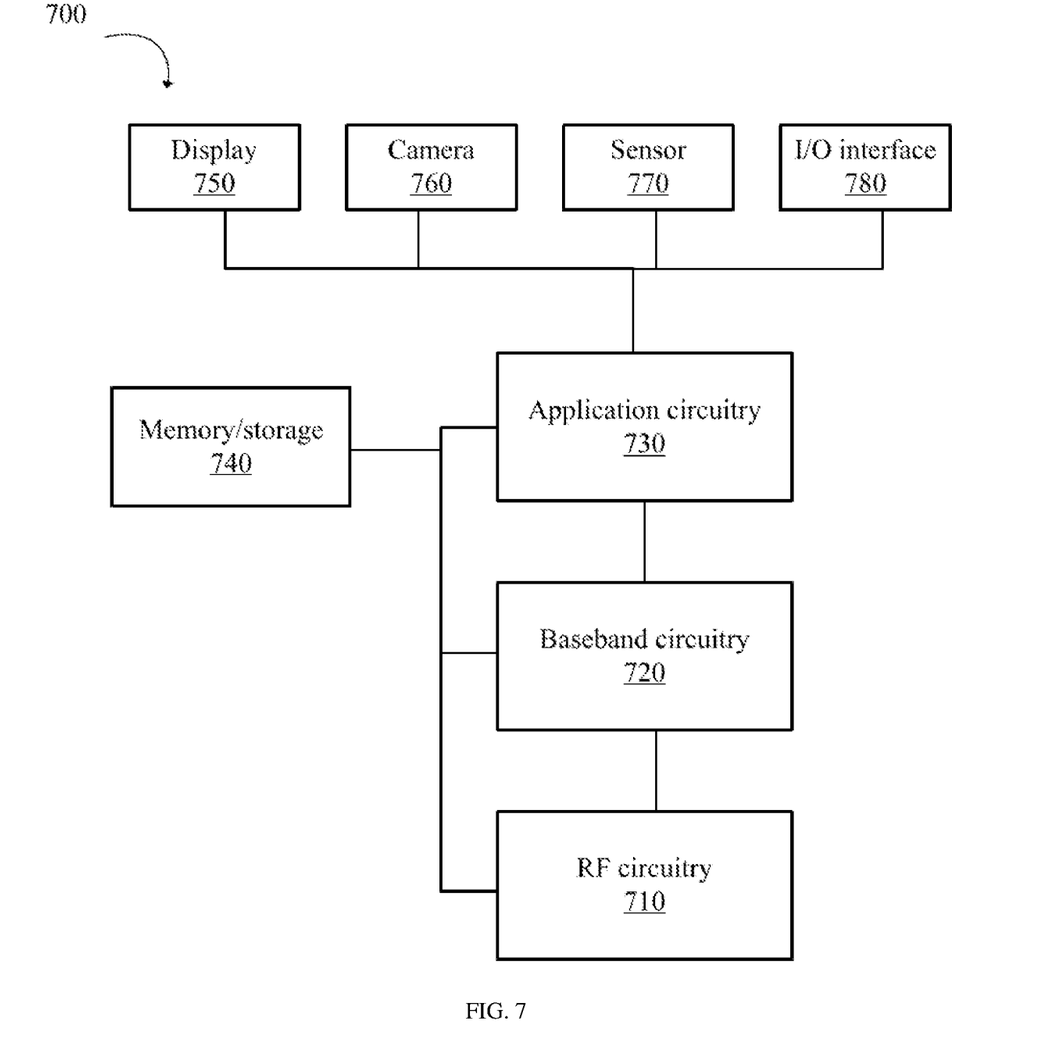
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for resource exclusion and selection in new radio sidelink communication, comprising:
    a memory;
    a transceiver; and
    a processor coupled to the memory and the transceiver;
    wherein the processor is configured to:
    perform within a sidelink sensing period a resource sensing procedure;
    determine an initial candidate resource set within a resource selection window based on a sensing result from performing the resource sensing procedure;
    exclude a sidelink resource from the initial candidate resource set to form an updated candidate resource set; and
    perform selection of a sidelink resource from the updated candidate resource set;
    wherein excluding the sidelink resource from the initial candidate resource set comprises excluding all sidelink resources that are not adjacent to the allocated and/or reserved sidelink resource having an acceptable received signal strength indicator (RSSI) and/or reference signal received power (RSRP) level to form the updated candidate resource set.

2. The user equipment of claim 1, wherein performing the resource sensing procedure comprises decoding one or more physical sidelink control channels (PSCCHs) received within the sidelink sensing period.

3. The user equipment of claim 1, wherein performing the resource sensing procedure comprises extracting resource allocation and/or reservation information.

4. The user equipment of claim 1, wherein performing the resource sensing procedure comprises measuring a received signal strength indicator (RSSI) and/or reference signal received power (RSRP) level of a received sidelink transmission from another user equipment.

5. The user equipment of claim 1, wherein determining the initial candidate resource set comprises excluding an allocated and/or reserved sidelink resource within the resource selection window.

6. The user equipment of claim 1, wherein excluding the sidelink resource from the initial candidate resource set to form the updated candidate resource set comprises excluding a sidelink resource based on a target transmission power, a measurement of a RSSI and/or RSRP level of the allocated and/or reserved sidelink resource, and a maximum allowable power difference.

7. The user equipment of claim 1, wherein excluding the sidelink resource from the initial candidate resource set to form the updated candidate resource set comprises excluding any sidelink resource from the initial candidate resource set that is not feasible for the processor to set or determine transmission output power of the user equipment at a level that is within an allowable maximum power difference to all adjacent sidelink resources.

8. A method for resource exclusion and selection in new radio sidelink communication of a user equipment, comprising:
   performing within a sidelink sensing period a resource sensing procedure;
   determining an initial candidate resource set within a resource selection window based on a sensing result from performing the resource sensing procedure;
   excluding a sidelink resource from the initial candidate resource set to form an updated candidate resource set; and
   performing selection of a sidelink resource from the updated candidate resource set;
   wherein excluding the sidelink resource from the initial candidate resource set comprises excluding all sidelink resources that are not adjacent to the allocated and/or reserved sidelink resource having an acceptable received signal strength indicator (RSSI) and/or reference signal received power (RSRP) level to form the updated candidate resource set.

9. The method of claim 8, wherein performing the resource sensing procedure comprises decoding one or more physical sidelink control channels (PSCCHs) received within the sidelink sensing period.

10. The method of claim 8, wherein performing the resource sensing procedure comprises extracting resource allocation and/or reservation information.

11. The method of claim 8, wherein performing the resource sensing procedure comprises measuring a received signal strength indicator (RSSI) and/or reference signal received power (RSRP) level of a received sidelink transmission from another user equipment.

12. The method of claim 8, wherein determining the initial candidate resource set comprises excluding an allocated and/or reserved sidelink resource within the resource selection window.

13. The method of claim 8, wherein excluding the sidelink resource from the initial candidate resource set to form the updated candidate resource set comprises excluding a sidelink resource based on a target transmission power, a measurement of a RSSI and/or RSRP level of the allocated and/or reserved sidelink resource, and a maximum allowable power difference.

14. The method of claim 8, wherein excluding the sidelink resource from the initial candidate resource set to form the updated candidate resource set comprises excluding any sidelink resource from the initial candidate resource set that is not feasible for the user equipment to set or determine transmission output power of the user equipment at a level that is within an allowable maximum power difference to all adjacent sidelink resources.

15. The method of claim 8, wherein performing the selection of the sidelink resource from the updated candidate resource set is randomly or based on a prioritization rule for a sidelink transmission.

16. The method of claim 15, wherein performing the selection of the sidelink resource from the updated candidate resource set further comprises adjusting a transmission output power of the selection of the sidelink resources.

17. A non-transitory machine-readable storage medium having stored thereon instructions that, when executed by a computer, cause the computer to perform the method of claim 8.

18. A terminal device, comprising: a processor and a memory configured to store a computer program, the processor configured to execute the computer program stored in the memory to perform the method of claim 8.

* * * * *